C. W. DODGE, Jr.
FLUID CLUTCH MECHANISM.
APPLICATION FILED DEC. 11, 1907.
912,652.
Patented Feb. 16, 1909.
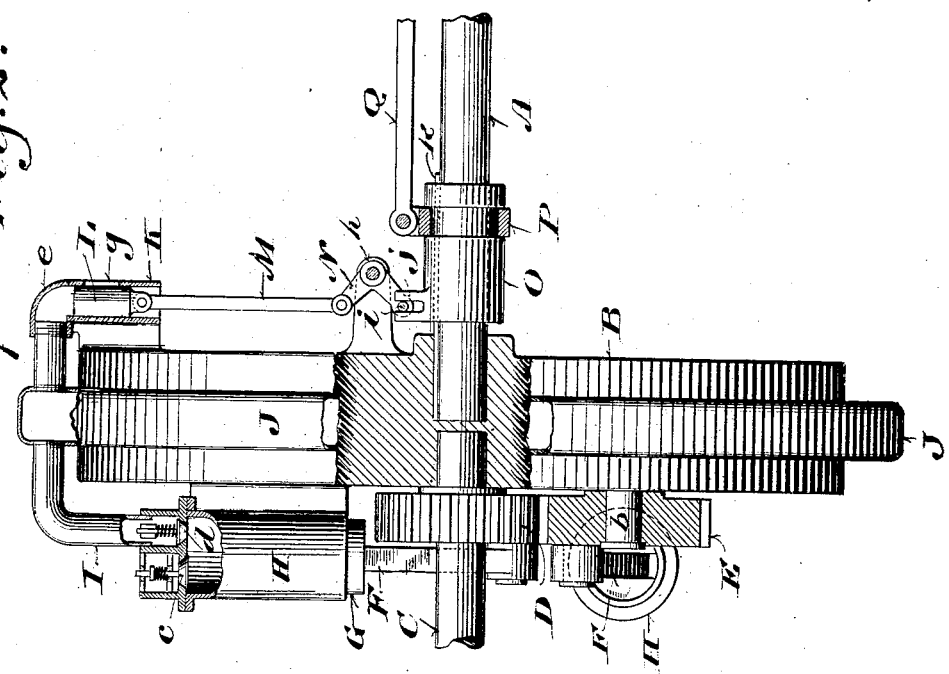
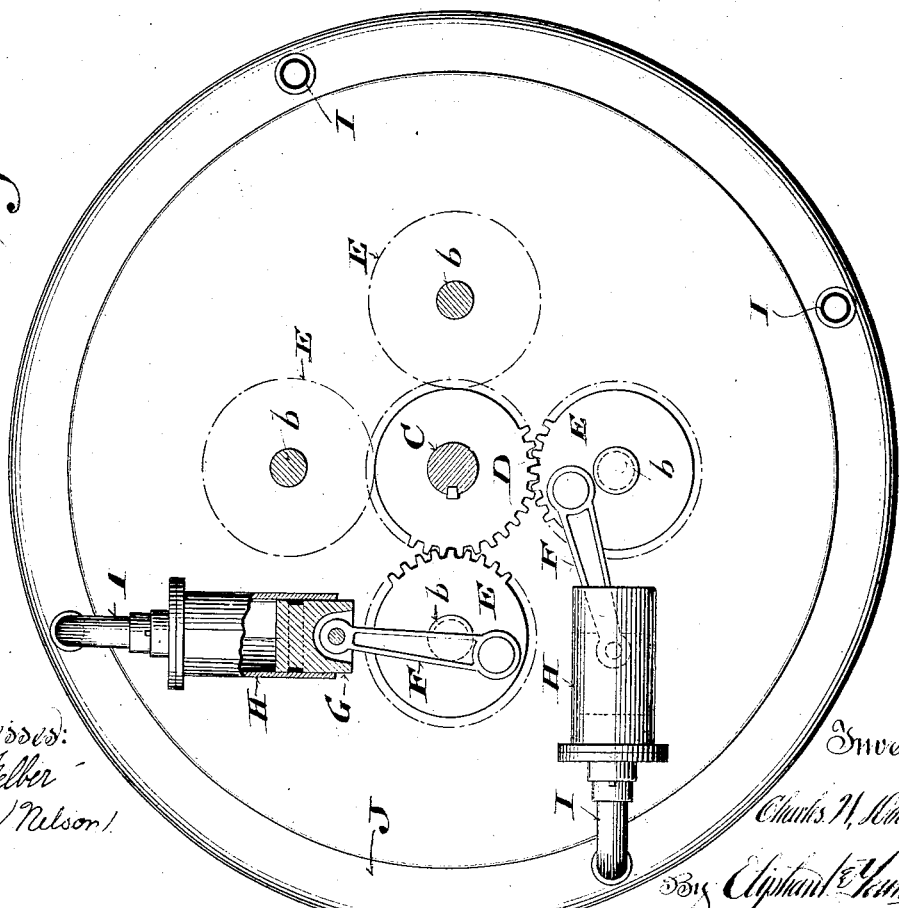

UNITED STATES PATENT OFFICE.

CHARLES W. DODGE, JR., OF MILWAUKEE, WISCONSIN, ASSIGNOR OF ONE-HALF TO JOHN HERBERT FARRELL, OF DENVER, COLORADO.

FLUID-CLUTCH MECHANISM.

No. 912,652.      Specification of Letters Patent.      Patented Feb. 16, 1909.

Application filed December 11, 1907. Serial No. 406,023.

*To all whom it may concern:*

Be it known that I, CHARLES W. DODGE, Jr., a citizen of the United States, and resident of Milwaukee, in the county of Milwaukee and State of Wisconsin, have invented certain new and useful Improvements in Fluid-Clutch Mechanism; and I do hereby declare that the following is a full, clear, and exact description thereof.

The invention has for its object to provide a simple, economical fluid-clutch mechanism by which a driven-shaft may be started from rest and gradually speeded to finally attain the same speed as a drive-shaft that has in the meantime been rotating at practically constant speed; said invention consisting in what is hereinafter particularly set forth with reference to the accompanying drawings and also hereinafter claimed.

Figure 1 of the drawings represents a partly sectional end elevation of a fluid-clutch mechanism in accordance with my invention, and Fig. 2, a partly sectional side elevation of said mechanism.

Referring by letter to the accompanying drawings, A indicates the drive-shaft of an engine, motor or other prime mover, and keyed or otherwise rigidly secured to the same is a support B of preferably annular form, which support may be the fly-wheel of an explosive-engine. Loose at one end in a socket of the support B is a driven-shaft C, alined with the drive-shaft, and keyed on or otherwise rigidly secured on the driven-shaft is a gear D in mesh with one or more similar gears E, each of which turns on a stud b of said support. Four gears E are herein shown and indicated at quarters of a circle, this being the preferable number and arrangement of said gears.

A pitman F connects each of gears E with a piston G reciprocative in a cylinder H open at one end, and having its single head provided with an air-inlet and air-outlet. A preferably spring-controlled check-valve c governs the air-inlet, and a similar valve d governs the air-outlet of the cylinder, which cylinder, the piston reciprocative therein and said valves combine to constitute a single-acting compressor, having said air-outlet thereof in communication, through a pipe I, with a receiver J carried by the support B preferably circumferentially of the same.

Attached to the support B is a cylindrical casing K having an elbow e thereof connected, by a pipe f, with the receiver J, and an outlet-port g of the casing is controlled by a slide-valve L connected by a link M with one arm of a bell-crank lever N in fulcrum-connection with a lateral bracket h of said support. Extending laterally from the other arm of the bell-crank lever is a pin i engaging a forked lug j of a collar O in sliding engagement with the drive-shaft A and a spline k of same, this collar being provided with an annular groove engaged by a spanner-ring P that is connected by a link Q with a lever or other controlling device.

The valve L in the position shown acts as a cut-off to prevent the escape of air from the receiver J into which it is discharged from each of the compressors aforesaid, but if said valve be adjusted to fully uncover the port g of its casing K the air from each compressor has unobstructed passage through said receiver and casing to atmosphere, the valve-adjustment in either instance being effected as the result of a movement of the collar O in sliding engagement with the drive-shaft.

If the drive-shaft A be rotating and the driven-shaft C at rest, the slide valve L will be adjusted to open the port of its casing K so as to not interfere with the escape of air discharged from the compressors into the receiver J, during which time each gear E turns on its own axis and rolls around the circumference of the gear D with which it is meshed to thereby impart reciprocation to the piston G of the relative compressor. Now supposing the slide-valve is adjusted to close the port of its casing, the escape of air from the receiver J is cut-off, and as the support B continues to rotate, air from each compressor is discharged into said receiver, the pressure therein gradually increasing. Owing to this increase of pressure in the receiver J, a greater pressure must be exerted by each piston G to force air from its companion cylinder H into said receiver, the result being that each of the gears E exerts a continually increasing force tending to rotate the gear D and driven-shaft C to which it is rigidly secured. This continues until the turning effort on the gear D is sufficient to overcome its resistance to said gears E, at which time these gears and the one D become fixed with respect to each other and the rotary support B, the pistons G cease to reciprocate and the driven-shaft is running at the same speed as the drive-shaft, said driven-shaft having started from rest and gradually attained its full speed without jar or appreciable diminution of speed of said drive-shaft.

I claim:

1. The combination of a drive-shaft, a support in rigid connection with the shaft, a driven shaft, a gear fast on the driven-shaft, another gear normally loose on a stud of the support in mesh with the gear aforesaid, an air-compressor attached to said support and having its piston in pitman-connection with the gear on said stud, and a cut-off for the compressor.

2. The combination of a drive-shaft, a support in rigid connection with the shaft, a driven-shaft, a gear fast on the driven-shaft, a plurality of gears normally loose on studs of the support at intervals of a circle and in mesh with the gear aforesaid, air-compressors attached to said support and having their pistons in pitman-connection with the gears on said studs, a receiver also attached to the aforesaid support in communication with the several compressors, and a cut-off controlling an outlet of the receiver.

3. The combination of a drive-shaft, a support in rigid connection with the shaft, a driven-shaft, a gear fast on the driven-shaft, a plurality of gears loose on studs of the support at intervals of a circle and in mesh with the gear aforesaid, air-compressors attached to said support at intervals of a circle and having their pistons in pitman-connection with the gears on said studs, a receiver also attached to the aforesaid support in communication with the several compressors, a casing in communication with the receiver, and a valve in the casing constituting a cut-off for an outlet port of same.

In testimony that I claim the foregoing I have hereunto set my hand at Milwaukee in the county of Milwaukee and State of Wisconsin in the presence of two witnesses.

C. W. DODGE, Jr.

Witnesses:
N. E. OLIPHANT,
GEORGE FELBER.